United States Patent
Sims et al.

(10) Patent No.: US 10,305,933 B2
(45) Date of Patent: May 28, 2019

(54) METHOD AND SYSTEM FOR IMPLEMENTING USAGE RESTRICTIONS ON PROFILES DOWNLOADED TO A MOBILE DEVICE

(71) Applicant: BlackBerry Limited, Waterloo (CA)

(72) Inventors: Richard Andrew Sims, Teddington (GB); Thomas Leonard Trevor Plestid, Ottawa (CA)

(73) Assignee: BlackBerry Limited, Waterloo (CA)

( * ) Notice: Subject to any disclaimer, the term of this patent is extended or adjusted under 35 U.S.C. 154(b) by 96 days.

(21) Appl. No.: 14/949,195

(22) Filed: Nov. 23, 2015

(65) Prior Publication Data

US 2017/0149827 A1  May 25, 2017

(51) Int. Cl.
| | |
|---|---|
| G06F 17/00 | (2006.01) |
| G06F 7/04 | (2006.01) |
| H04L 9/32 | (2006.01) |
| G06F 21/00 | (2013.01) |
| H04L 29/06 | (2006.01) |
| H04W 8/00 | (2009.01) |

(52) U.S. Cl.
CPC ............ *H04L 63/20* (2013.01); *H04L 63/102* (2013.01); *H04W 8/00* (2013.01)

(58) Field of Classification Search
CPC .............................. H04L 63/20; H04L 63/102
USPC .................................. 726/1, 4; 713/168, 182
See application file for complete search history.

(56) References Cited

U.S. PATENT DOCUMENTS 9,380,454 B2 * 6/2016 Kukuchka ............... H04W 8/18
2008/0178166 A1 * 7/2008 Hunter ................ G06F 9/44521
717/165

(Continued)

FOREIGN PATENT DOCUMENTS

| EP | 2773077 A1 | 9/2014 |
|---|---|---|
| WO | 2014171707 A1 | 10/2014 |
| WO | 2015088411 A1 | 6/2015 |

OTHER PUBLICATIONS

International Searching Authority, International Search Report for PCT/EP2015/076864, dated Dec. 9, 2016.

(Continued)

*Primary Examiner* — Aravind K Moorthy
(74) *Attorney, Agent, or Firm* — Moffat & Co (57) ABSTRACT

A method and computing device for enablement of a disabled profile or a third party application associated with the disabled profile on the device, the method including receiving, at an identity module on the device, a request to enable the disabled profile or the third party application; obtaining, from each profile on the device that is currently active, a respective policy; obtaining, from the disabled profile, a policy for the disabled profile; determining, based on the respective policies obtained from the active profiles and based on the policy for the disabled profile, whether the disabled profile or third party application can be enabled; and providing a response to the request to enable the disabled profile based on the determining.

20 Claims, 7 Drawing Sheets

(56) References Cited

U.S. PATENT DOCUMENTS

| | | | |
|---|---|---|---|
| 2009/0086630 A1* | 4/2009 | Hamada | H04L 63/0272 370/230 |
| 2010/0248719 A1* | 9/2010 | Scholaert | H04M 1/725 455/434 |
| 2011/0207503 A1* | 8/2011 | Ruperto | H04W 48/18 455/552.1 |
| 2012/0179823 A1* | 7/2012 | Hatasaki | G06F 9/461 709/226 |
| 2013/0231087 A1* | 9/2013 | O'Leary | H04W 8/22 455/411 |
| 2015/0110035 A1* | 4/2015 | Lee | H04W 12/08 370/329 |
| 2015/0142974 A1* | 5/2015 | Bernaudin | H04L 67/306 709/225 |
| 2015/0281964 A1 | 10/2015 | Seo | |
| 2015/0350219 A1* | 12/2015 | Selander | H04L 63/102 726/1 |
| 2016/0021529 A1* | 1/2016 | Park | H04W 8/205 455/410 |
| 2017/0060878 A1* | 3/2017 | Demant | G06F 17/3056 |
| 2017/0070762 A1* | 3/2017 | Natarajan | H04N 21/25816 |

OTHER PUBLICATIONS

Groupe Speciale Mobile Association (GSMA), "Remote SIM Provisioning for Consumer Devices Industry Alignment", May 28, 2015.

Groupe Speciale Mobile Association (GSMA), SPG.02: "Remote Provisioning Architecture for Embedded UICC Technical Specification", Version 3.0, Sep. 30, 2015.

ETSI, TS 103 383 v12.7.0, "Smart Cards; eUICC; Requirements Specification", Feb. 2015.

ETSI, TS 103 384 v0.11.0, Draft Specification, "Smart Cards; eUICC; Technical Specification (Release 13)", Jan. 2015.

Global Platform Card Specification v 2.2.1, Jan. 2011.

Groupe Speciale Mobile Association (GSMA), "Remote SIM Provisioning for Consumer Devices Business Requirements, v1.0", Feb. 2015.

Groupe Speciale Mobile Association (GSMA), "Remote SIM Provisioning for Consumer Devices, Original Equipment Manufacturer (OEM) Business Requirements, v1.0," Apr. 2015.

European Patent Office, Examination Report for Application No. 16793845.5, dated Mar. 4, 2019.

* cited by examiner

METHOD AND SYSTEM FOR IMPLEMENTING USAGE RESTRICTIONS ON PROFILES DOWNLOADED TO A MOBILE DEVICE

FIELD OF THE DISCLOSURE

The present disclosure relates to profiles as found on identity cards, including embedded universal integrated circuit cards (eUICCs), and in particular relates to the policies for these profiles.

BACKGROUND

In order to operate on a mobile network operator's system, a mobile device may need an identity or profile that is validated with that mobile network operator. Such profile is typically stored in the mobile device. For example, a subscriber identity module (SIM) or universal integrated circuit card (UICC) may be utilized to store an identity profile and to provide identity information for the mobile device to enable operation on the communication network.

An embedded UICC is a UICC that may be implemented in hardware or software and is not easily accessible or replaceable. In operation, an eUICC is not intended to be removed or replaced in a mobile device or terminal. An eUICC may permit the secure provisioning of and changing of profiles or subscriptions on the device.

In some situations, multiple SIM devices in which a mobile device or terminal has plural identity profiles are being created. Generally such devices include two slots for SIM or UICC cards. As such, such multiple SIM devices have limitations including increased cost of hardware to support two SIMs. With a eUICC, it is technically possible to have multiple profiles on a device. However, such profiles may conflict with each other and may be resisted by network operators.

BRIEF DESCRIPTION OF THE DRAWINGS

The present disclosure will be better understood with reference to the drawings, in which.

DETAILED DESCRIPTION OF THE DRAWINGS

The present disclosure provides a method for enablement of a disabled profile or a third party application associated with the disabled profile on a device, the method comprising: receiving, at an identity module on the device, a request to enable the disabled profile or the third party application; obtaining, from each profile on the device that is currently active, a respective policy; obtaining, from the disabled profile, a policy for the disabled profile; determining, based on the respective policies obtained from the active profiles and based on the policy for the disabled profile, whether the disabled profile or third party application can be enabled; and providing a response to the request to enable the disabled profile based on the determining.

The present disclosure further provides a computing device configured for enablement of a disabled profile or a third party application associated with the disabled profile, the computing device comprising: memory; a processor; an identity module; and a communications subsystem, wherein the computing device is configured to: receive, at the identity module on the device, a request to enable the disabled profile or the third party application; obtain, from each profile on the device that is currently active, a respective policy; obtain, from the disabled profile, a policy for the disabled profile; determine, based on the respective policies obtained from the active profiles and based on the policy for the disabled profile, whether the disabled profile or third party application can be enabled; and provide a response to the request to enable the disabled profile based on the determining.

The present disclosure further provides a non-transitory computer readable medium comprising program code, which when executed by a processor of a computing device are configured to cause enablement of a disabled profile or a third party application associated with the disabled profile on the computing device, the program code configured to: receive, at an identity module on the computing device, a request to enable the disabled profile or the third party application; obtain, from each profile on the device that is currently active, a respective policy; obtain, from the disabled profile, a policy for the disabled profile; determine, based on the respective policies obtained from the active profiles and based on the policy for the disabled profile, whether the disabled profile or third party application can be enabled; and provide a response to the request to enable the disabled profile based on the determining.

The present disclosure is described below with regard to eUICCs, where the UICC would not be removable or replaceable on a mobile device, but would rather be provisionable. However, the present disclosure is not limited to such eUICCs, and in other embodiments a removable UICC may be used to support multiple SIM profiles.

Further, as used in the present disclosure, a profile means a combination of a file structure, data and applications to be provisioned onto, or present on, an eUICC.

Further, as used herein, a device or terminal may be any computing device capable of communication in a mobile network using a profile. Such device or terminal may be a mobile device such as a laptop, cellular telephone, smart phone, camera, pager, among others, as well as fixed devices such as appliances, vending machines, smart parking meters, among others. The present disclosure is not limited to any particular device or mobile device.

Multiple SIM profiles on a device may be problematic for various reasons. First, if a device has multiple SIM profiles, a user of the device may have the ability to run certain applications that are mobile operator specific utilizing profiles other than those of the mobile network operator. A mobile network operator may provide the application for various reasons, including promotion or encouragement for a user to use the mobile network operator's services, due to agreements between the mobile network operator and the application creator, to facilitate use of the device in the mobile operator's network, among other reasons. By opening the application to use in a different profile, this may negatively impact an operator.

In a second aspect, the provisioning of multiple SIMs may allow the user to easily switch between operators to invoke a "race to the bottom" on pricing for subscriptions.

Also, embedded SIM profiles (eSIMS) are currently designed only for machine to machine (M2M) devices, and customer devices currently retain existing SIM card and tray designs.

In order to overcome the above, the present disclosure provides for the enabling of policies to be associated with profiles that are loaded onto devices or terminals.

Figure 1:
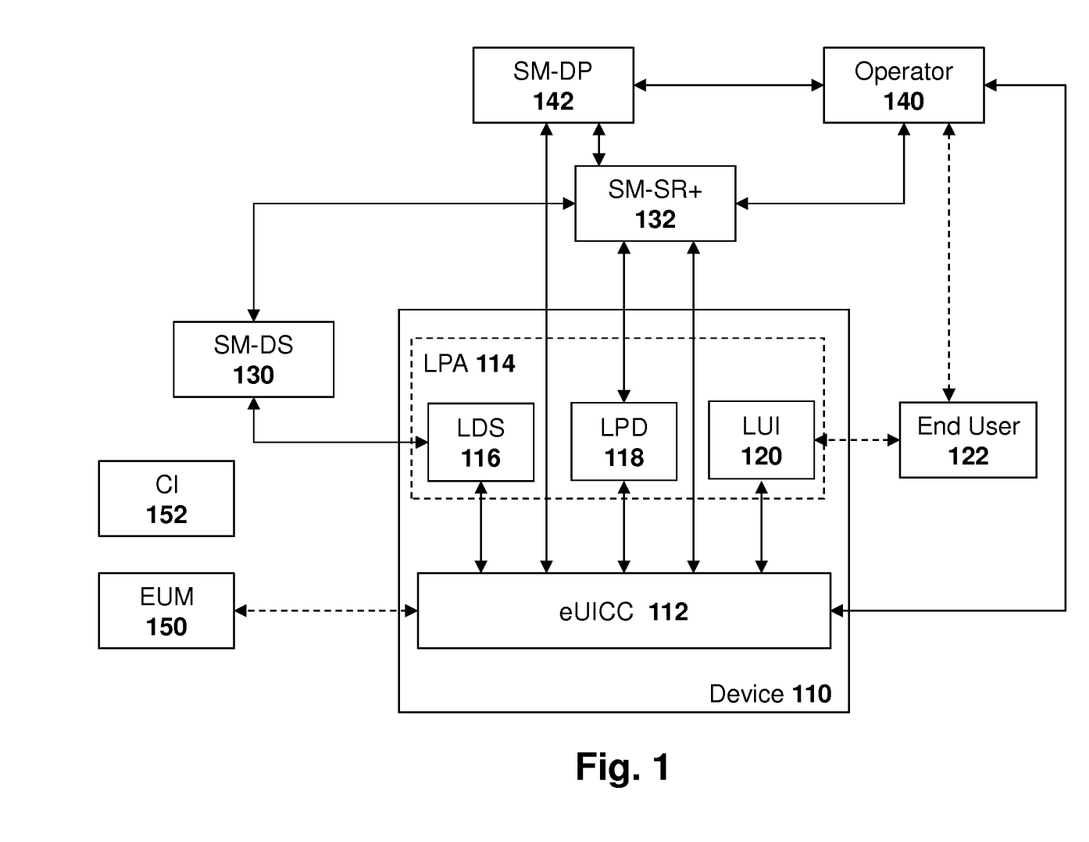
FIG. 1 is a block diagram showing a system for provisioning profiles to an eUICC.

Reference is now made to FIG. 1, which shows a proposed architecture for remote SIM provisioning as provided for by the Global System for Mobile Communications Association (GSMA) remote provisioning for consumer devices industry alignment.

As seen in FIG. 1, a device 110 may be used for communication with a network. Device 110 may be any mobile device or other terminal, and may be enabled as a consumer device or for machine to machine communications.

Device 110 includes an eUICC 112. As provided above, the eUICC may be used to store profiles. Further, the eUICC may be used to enforce policies as described below. One example of an eUICC is provided with reference to FIG. 2 below.

Further, a local profile assistant (LPA) 114 may be added to device 110. The LPA may, for example, be a software module that allows profile management on the device.

In the example of FIG. 1, LPA 114 includes a local discovery subscription manager-secure routing (LDS) module 116. LDS module 116 is used for connection with a subscription manger-discovery service (SM-DS) in order to retrieve an appropriate subscription manager-secure routing (SM-SR+) address. The SM-SR+ is responsible for the delivery of the profile to the eUICC.

LPA module 114 further includes a local profile download (LPD) module 118 to allow for efficient download of a profile to a device. The LPD module 118 allows for sufficient download of a profile in two stages. A first is to download a profile package from the SM-SR+ module 132 to the LPD module 118 in a single transaction and the second stage is the outward transfer of the profile package in to the eUICC 112 in segments.

A local user interface (LUI) module 120 allows an end user to administer profiles on the eUICC. Thus, end user 122 may administer such profiles on device 110.

Each of the modules in LPA module 114, namely LDS module 116, LPD module 118 and LUI module 120, communicate with the eUICC 112.

As further shown in FIG. 1, device 110 communicates with the SM-DS module 130 using the LDS module 116. SM-DS module 130 is responsible for allowing the device to discover which SM-SR has a profile package waiting for it. Specifically, the SM-DS module 130 provides two distinct functions. A first is profile download request registrations, which allow SM-SR+ modules to register a list of eUICCs to permit future download profile packages to be made to those eUICCs. A second function is the profile download request retrieval which provides a previously registered address of an associated SM-SR+ to an enquiring LPA.

Further, SM-SR+ module 132 is part of the system and communicates both with SM-DS 130 as well as with the LPD module 118. The SM-SR+ module 132 is responsible for temporary storage, delivery and management of profile packages through three distinct functions. A first is a profile package storage which may temporarily store profile packages for subsequent delivery to a target UICC 112. Further, the SM-SR+ module 132 may provide for profile package delivery, including establishing a secure and authenticated channel to the LPA module 114 or eUICC 112 in order to transmit the profile package. Further, the SM-SR+ may include management functions for devices not manageable through an LPA.

SM-SR+ module 132 interfaces with an operator 140 for profile management. The operator 140 is responsible for the establishment of the contract, billing management, business support systems (BSS) stack function and authentication for eUICC for service activation, among other functionality. Further, the operator 140 is responsible for ordering of the profile data on the subscription manager-data preparation (SM-DP) service and integration into BSS stack. The operator may provide updates on the eUICC profile configuration and further ensures that all security policies and accreditation are managed correctly.

SM-SR+ module 132 may further interface with a SM-DP module 142 in order to obtain profile packages.

In one embodiment, multiple SM-SR+ modules 132 can interface to the same LPA module 114 on a temporal basis.

The eUICC 112 will be issued from an eUICC manufacturer (EUM) 150. The EUM 150 is responsible for producing the eUICC in a secure location to required specifications, including certification of hardware of the eUICC and certification of software within the eUICC 112.

Further, a certificate issuer (CI) 152 may issue certificates for accredited players of the system roles to act as a trusted third party for the purpose of role authentication and trust establishment.

In the embodiment of FIG. 1, when a profile is created by the SM-DP, operator 140 can define policy rules. Under current specifications, policy 1 is defined for the profile instance in the SM-DS 130 and policy 2 is used for the instance in the downloaded profile on the eUICC, as for example, defined in the GSMA SPG.02: "Remote Provisioning Architecture for Embedded UICC Technical Specification", Version 3.0, Jun. 12, 2015, the contents of which are incorporated herein by reference.

Reference is now made to Table 1 below, which shows a data field sent in a command message by an operator to update policy 1 rules. In Table 1 below, the values may be mandatory, optional, or conditional (MOC).

TABLE 1

| POL1 Update Data Field | | | | |
|---|---|---|---|---|
| DGI | Length | Value Description | | MOC |
| '3A06' | Var | POL1 Policy Rules | | M |
| | Tag | Length | Value Description | MOC |
| | '81' | '01' | New POL1 | M |

As seen in Table 1, policy 1 policy rules may be updated by an operator utilizing the data structure shown. In Table 1 the new policy 1 is a mandatory field within the command message.

Referring to Table 2 below, the table shows the coding for policy 1 defined for the profile instance.

TABLE 2

POL1 Coding

| b8 | b7 | b6 | b5 | b4 | b3 | b2 | b1 | Meaning |
|---|---|---|---|---|---|---|---|---|
| — | — | — | — | — | 0 | 0 | 0 | No POL1 rule active |
| — | — | — | — | — | 0 | — | 1 | Disabling of this Profile not allowed |
| — | — | — | — | — | 0 | 1 | — | Deletion of this Profile not allowed |
| — | — | — | — | — | 1 | 0 | 0 | Profile deletion is mandatory when its state is changed to disabled |
| — | — | — | — | — | X | X | X | Other combinations are forbidden |
| X | X | X | X | X | — | — | — | Reserved for future use |

In Table 2 above, while policy 1 currently has 8 bits reserved, the first 3 bits are currently used for coding. In particular, if b1, b2 and b3 are all set to 0, then no policy 1 rule is activity. In other cases, if b1 is set to 1 and b3 is set to 0 then the disabling of the profile is not allowed at the device 110.

Further, if b2 is set to 1 and b3 is set to 0 then the deletion of the profile is not allowed at the device 110.

As seen in Table 2, if b3 is set to 1 then profile deletion is mandatory when the state is changed or disabled.

Table 2 further shows, in the last two lines, that other combinations are forbidden and that the b4 to b8 bits are reserved for future use.

Policy 2 is downloaded on to the eUICC. An example of the policy 2 rule type data structure is provided below with regard to Table 3.

TABLE 3

POL2 Rule

| Data Name | Description | Type | No. | MOC |
|---|---|---|---|---|
| Subject | Identifies the subject on which the rule has to be applied. In the current version, the possible subject is restricted to "PROFILE". | Enumeration {PROFILE} | 1 | M |
| Action | Identifies the action/function on which the rule has to be applied. | Enumeration {ENABLE, DISABLE, DELETE} | 1 | M |
| Qualification | Indicates the final result of the rule that has to be applied | Enumeration {Not allowed, Auto-delete} | 1 | M |

As seen in Table 3 above, the policy may be directed to a subject. Current policy descriptions are limited to being directed to a profile.

Further, as seen in Table 3, actions are identified for the rule. The actions include enable, disable and delete.

Further, a qualification is defined which indicates the final result of the rule that is to be applied. The qualification may indicate that certain actions are not allowed or that certain actions require auto deletion, for example.

Applying Table 3, if a policy, for example, indicates that disabling of the profile is not allowed, then the subject will be set to "PROFILE", the action will be sent to "DISABLE" and the qualification will be set to "NOT ALLOWED".

Similarly, utilizing Table 3, if a policy is that deletion of the profile is not allowed, then the subject will be set to "PROFILE", the action will be set to "DELETE", and the qualification will be set to "NOT ALLOWED".

Further, if profile deletion is mandatory when the profile is disabled, then Table 3 may be utilized by setting the subject to "PROFILE", the action set to "DISABLE", and the qualification set to "AUTO DELETE".

Other combinations utilizing the current policy 2 structure are not valid at present.

Figure 2:
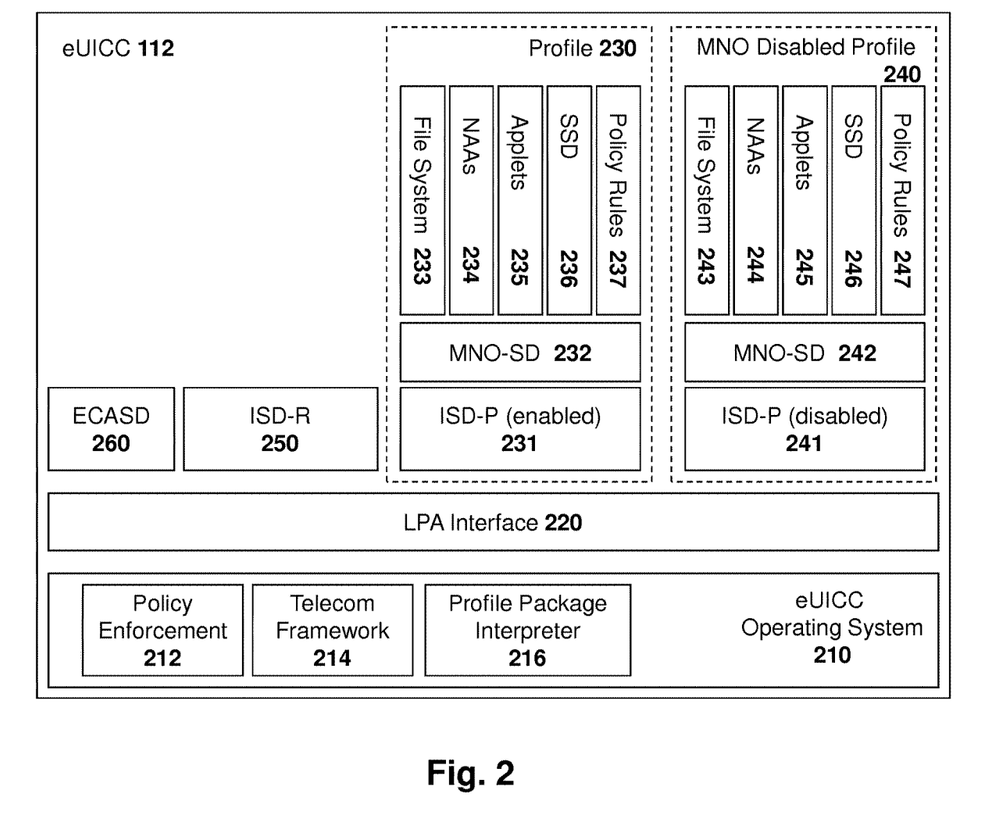
FIG. 2 is a block diagram showing functional components of an eUICC.

Reference is now made to FIG. 2, which shows one example of eUICC 112. In particular, eUICC 112 has an operating system 210 which is used to control operation of the eUICC. Operating system 210 includes a policy enforcement module 212, a telecom framework module 214 as well as a profile package interpreter 216 in the example of FIG. 2.

Further, eUICC 112 includes an LPA interface 220. The LPA interface 220 is used to talk to the LPA module on the device. For example, this is shown in FIG. 1 by LPA module 114.

An eUICC 112 may have a plurality of profiles on the device. The example of FIG. 2 shows a profile 230 which is active as well as a mobile network operator disabled profile 240.

Profile 230 includes an issuer security domain-profile (ISD-P) module 231, which in the example of FIG. 2 is enabled. The ISD-P module is an on-card representative of the SM-DP. The SM-DP performs the profile download and installation functions on the ISD-P.

The profile 230 further includes mobile network operator-security domain (SD) module 232, which is used to manage the content of the profile once the profile is enabled.

Further, profile 230 may include a file system 233, network access applications (NAAs) 234, applets 235, supplementary secure domain (SSD) 236 and policy rules 237.

The NAAs 234 are applications residing on the eUICC which provide authorization to access a network.

SSDs define secure domains that are the used by application suppliers on the UICC.

Similarly, the MNO disabled profile 240 includes an ISD-P 241, MNO-SD 242, file system 243, NAAs 244, applets 245, SSD 246 and policy rules 247.

An issuer security domain-root (ISD-R) module 250 is in charge of the creation of new ISD-Ps and life cycle management of all profiles in accordance with policy rules.

Further, eUICC Controlling Authority Security Domain (ECASD) module 260 is used for storing a certificate for the eUICC.

Thus, in accordance with FIG. 2, the ISD-R 250 on the eUICC 112 is responsible for the local profile management enforcement of policy rules. The LPA 114 from FIG. 1 is then responsible for communicating these policy rules to an end user.

Profiles, such as profile 230 or 240 may be enabled utilizing a command such as an enable profile command. Such command is defined in the GSMA SPG.02 specification, for example in Section 4.1.1.2. An example is shown with regards to Table 4 below.

TABLE 4

Enable Profile

| DGI | Length | Value Description | | | MOC |
|---|---|---|---|---|---|
| '3A03' | Var | Enable Profile | | | M |
| | Tag | Length | Value Description | | MOC |
| | '4F' | 5-16 | IDS-P-AID | | M |

As seen in Table 4 above, the enable profile function is used to enable a profile on the eUICC by the SM-SR.

In current situations, multiple profiles may exist on M2M devices. However, for consumer devices operators are reluctant to allow multiple profiles in an eUICC for the reasons provided above.

In accordance with the present disclosure, the embodiments below describe an implementation that allows operators to retain control of how a downloaded profile is used by an eUICC on a device. The retention of control provides a route to facilitate acceptance by operators of an eUICC having multiple simultaneous active profiles on a single eUICC.

Thus, when a profile is downloaded to an eUICC from the remote provisioning platform, an operator may want to restrict certain operations that the device can perform with the profile. For example, an operator may want to prevent a profile being activated in conjunction with other profiles. This may be used to prevent multiple simultaneous active profiles that would allow a user to be able to select and switch instantly between a variety of profiles for commercial purposes.

An operator may further want to prevent certain third party applications found in a profile from being accessible unless such profile is the active profile. Thus, a user may temporarily switch profiles when roaming but may still want access to, for example, banking or transport payment applications that are part of the non-active profile. Some service operators may want to prevent this as a way to stop users from switching between profiles in order to retain roaming fees or due to contractual agreements with the application provider.

In some embodiments, restrictions could be applied geographically. For example, restrictions may be applied in a home country or home network or may be applied only when roaming in other cases. In further cases, restrictions may be applied when the device is both in the home country or while roaming.

In order to accomplish the above, the present disclosure allows a service operator, via a SM-DP, to set policy rules in the downloaded profile. These policy rules may then be validated by the ISD-R before allowing profile activation or use. The policy rules allow an operator to control when a profile can be active. This may include, for example, allowing one profile to be active when an alternative profile is not active or allowing simultaneous profiles to be active if the device is currently in its home network. Other configurations are possible.

The options for allowing activation would, in one embodiment, be selectable by an operator and may address concerns by operators with regard to having multiple active profiles on a device.

The above is accomplished by adding rules to the policy 1 and policy 2 tables provided above with regard to Tables 2 and 3.

The present disclosure therefore provides for the provisioning of a profile associated with one or more new policy rules. The disclosure further provides a check for whether a policy rule is associated with a profile prior to activation of that profile. Specifically, the activation of a profile may be prohibited by a policy associated with either the profile for which the activation request is being made or with a different profile that is currently active.

The check for whether a policy rule is associated with a profile may include a determination of the currently registered network, the country code associated with the registered network, or other combination of such factors. The check may further include a determination of the home network associated with one or more of the profiles.

In accordance with other embodiments of the present disclosure, a notification to a user may be provided to indicate a reason why a profile cannot be activated. For example, this may be a displayed message on a user interface of the device.

The present disclosure further provides for checks or notifications for the use of third party applications associated with particular profiles.

Reference is now made to Table 5 below, which utilizes a similar data structure for the policy 1 and policy 2 described above. Table 5 provides an extension of the policy 1 and policy 2 tables to provide for policy extensions.

TABLE 5

New POL1/POL2 Table

| Bit | Meaning |
|---|---|
| 0 | No POL1 rule active |
| 1 | Disabling of this Profile not allowed |
| 2 | Deletion of this Profile not allowed |
| 3 | Profile deletion is mandatory when its state is changed to disabled |
| 4 | No restrictions on multiple active profiles |
| 5 | Profile can only be active on its own |
| 6 | Profile can be active in conjunction with other profiles at home |
| 7 | Profile can be active in conjunction with other profiles in roaming |
| 8 | Profile can be active in conjunction with another profile when roaming in particular countries |
| 9 | Cannot be active in presence of other particular profiles |
| 10 | No restrictions on third party application use |
| 11 | Third party applications stored in the profile can only be used when the profile is active |
| 12 | Third party applications stored in the profile can only be used when the profile is active and when home |
| 13 | Third party applications stored in the profile can only be used when the profile is active and when roaming |
| 14 | Third party applications stored in the profile can be used when the profile is not active but not in conjunction with other third party applications stored in the active profile. A list of applications is needed. A Pol1/2 extension parameter can be used to store the list of applications |
| 15 | Third party applications stored in a disabled profile cannot be used in conjunctions with the current active profile. |

As seen in Table 5 above, the new data structure allows for control of multiple active profiles. In particular, various bits are defined for various actions and for control of third party application use.

Thus, bit 4 may provide for no restrictions on multiple active profiles. Bit 5 can be used to indicate that the profile can only be active on its own. Bit 6 may be used to indicate that the profile can be active in conjunction with other profiles but only in a home network.

Bit 7 may be used to indicate that the profile can be active in conjunction with other profiles during roaming.

Bit 8 may be used for more granular definition of when the profile can be active in conjunction with another profile by limiting the profile being active to roaming in particular countries.

Bit 9 allows for data to be provided to the eUICC that the active profile cannot be active in the presence of specific other profiles.

Similarly, bits are provided in Table 5 for the control of third party application use. Such bits include bit 10 which provides for no restrictions on third party application use. Bit 11 provides for the third party application stored in the profile to be only used when the profile is active. Bit 12 is used to indicate that the third party applications stored in a profile may be only used when the profile is active and when at home.

Similarly, bit 13 is used to indicate that third party applications that are stored in the profile may only be used when the profile is active and when roaming.

Bit 14 may be used to indicate that the third party application may be used when the profile is not active but may limit the application from running when other third party applications that are stored in the active profile are used.

Bit 15 indicates that a third party application stored in disabled profile cannot be used in conjunction with the current active profile.

By utilizing separate bits for each of these fields, multiple concurrent values may be defined for the rules utilizing the restrictions in Table 5 above.

As will be appreciated by those in the art, the embodiment of Table 5 is merely an example and other similar extensions to the policy 1 and policy 2 tables above may be implemented. Thus, the present disclosure is not limited to a particular set of coding tables but it merely indicates that the coding table may be extended to provide for rules regarding multiple profiles and applications associated with those profiles.

As seen from Table 5 above, various policy extensions include enumerated lists. For example, bit 8 indicates that the profile can be active in conjunction with another profile when roaming in particular countries. Thus the particular countries need to be enumerated.

Similarly bit 9 requires that the profile cannot be active in the presence of other particular profiles and thus a list of particular profiles needs to be provided.

Similarly, bit 14 indicates that the third party application stored in the profile can be used when the profile is not active but not in conjunction with other enumerated third party applications.

In order to accommodate such lists, extensions may be provided. Thus, Table 1 above may be expanded to include optional fields to indicate whether extensions exist. Reference is made to Table 6 below.

TABLE 6

| Command Message Data Field | | | | |
|---|---|---|---|---|
| DGI | Length | Value Description | | MOC |
| '3A06' | Var | POL1 Policy Rules | | M |
| | | Tag | Length | Value Description | MOC |
| | | '81' | '01' | New POL1 | M |
| | | 82 | 01 | POL1/2 Extension 1 | O |
| | | 83 | 01 | POL1/2 Extension 2 | O |
| | | 84 | 01 | POL1/2 Extension 3 | O |

As seen in Table 6, three new "tags" are added, namely tags 82, 83 and 84. Tag 82 is associated with a first extension and is an optional inclusion. Tag 83 is associated with a second extension and again is optional and tag 84 is associated with a third extension and is optional.

The first extension associated with tag 82 may be a list of the particular countries that the profile can be active in conjunction with another profile when roaming. Thus, the first extension may be associated with bit 8 of Table 5 above.

In this regard, in the first extension, the ISD-R may access the extension 1 data for the active and selected profiles to identify which roaming countries the policy rules do not allow multiple active profiles on. The ISD-R may then make a decision on whether a profile can be activated.

Referring to Table 7, various parameters may be used to define the countries. These include a country name and mobile country code (MCC).

TABLE 7

| POL1/2 Extension1 Data | | |
|---|---|---|
| Name | Value | MOC |
| Country1 | MCC | M |
| Country2 | MCC | O |
| . . . | MCC | O |
| Countryn | MCC | O |

Thus, as seen in Table 7 a first country must be defined to indicate in which country the policy rules do not allow for multiple active profiles. The first data field is mandatory because if the extension was used then at least one country should be specified.

The other countries, listed as country 2 to country n are shown as optional values within Table 7.

Similarly, the second extension associated with tag 83 is utilized for the profile not being allowed to be active in the presence of other particular profiles. In other words, the extension 2 is used for bit 9 of Table 5 above.

As seen in Table 8 below, the ISD-R can access the extension 2 data for the selected and active profiles to identify a list of operator profiles that cannot be activated together with multiple active profile scenarios. Data in Table 8 includes the MCC, Mobile Network Code (MNC) and group identifier (GID).

TABLE 8

| POL1/2 Extension2 Data | | |
|---|---|---|
| Name | Value | MOC |
| Profile1 | MCC, MNC, GID1 | M |
| Profile2 | MCC, MNC, GID1 | O |
| . . . | MCC, MNC, GID1 | O |
| Profilen | MCC, MNC, GID1 | O |

In Table 8, the profile name and the location for that profile are provided in the extension 2 data to allow for the eUICC to make a decision on whether or not a second profile or subsequent profile may be activated.

Tag 84 is associated with extension 3, which is used for third party applications stored in the profile that cannot be active or used when the profile is not active but not in conjunction with other third party applications stored in the active profile. In other words, extension 3 is used for the data for bit 11 of Table 5 above.

In extension 3 data, the ISD-R is allowed to access data for the selected and active profiles to define the list of third party application identifiers that cannot be used simultaneously.

TABLE 9

| POL1/2 Extension3 Data | | |
|---|---|---|
| Name | Value | MOC |
| ApplicationID1 | 'xxxxxxxx' | M |
| ApplicationID2 | 'xxxxxxxx' | O |
| . . . | 'xxxxxxxx' | O |
| ApplicationIDn | 'xxxxxxxx' | O |

As seen in Table 9 above, if an application is present, it cannot be active when an active profile application enumerated in Table 9 is also active. If an application is not assigned an application identifier, it is assumed to be an operator application and not a third party application and can only be used when the profile containing the application is active.

As the ISD-R controls activation of profiles, it needs to know the MCC/MNC information of the currently registered network of the device to make policy rule decisions. This information may be provided to the ISD-R, for example by the LPA module 114 from FIG. 1.

Figure 3:
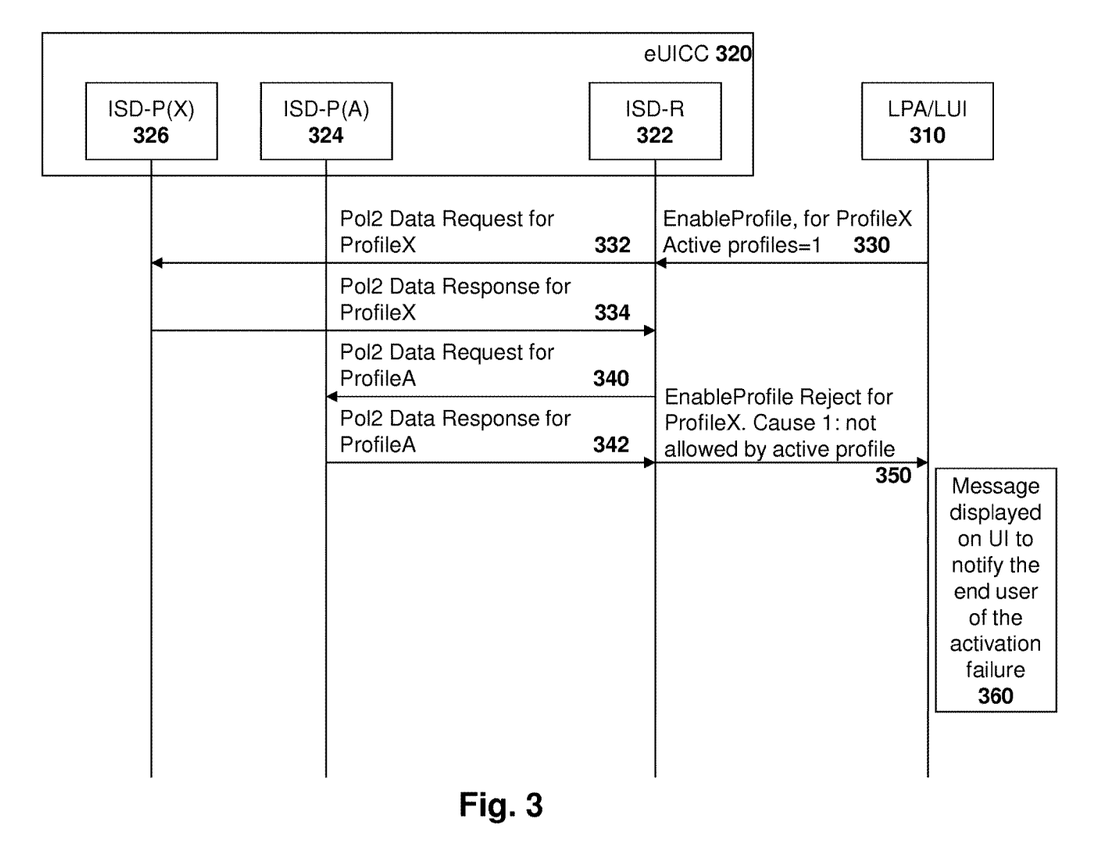
FIG. 3 is a data flow diagram showing messaging used to determine whether to enable an inactive profile on an eUICC having one active profile.

The above information may be utilized to determine whether or not a profile may be activated. Reference is now made to FIG. 3.

As seen in FIG. 3, a data flow diagram is provided in which a profile is attempted to be activated. In particular, an LPA/LUI 310 may receive, for example from a user, a request to enable a particular profile.

The LPA/LUI 310 communicates with the eUICC 320 and in particular with the ISD-R module 322. Further, the ISD-R module 322 may communicate with ISD-P module 324 for a currently active profile, along with the ISD-P module 326 for the profile for activation.

Thus, when activation of a profile is attempted, LPA/LUI module 310 sends an enable profile message 330 for profile "X" and utilizes an active profile =1 parameter since only one active profile exists. Message 330 is sent from the LPA/LUI 310 to ICD-R module 322.

Upon receipt of message 330, ISD-R 322 first pulls the new profile to be activated by sending the ISD-P (x) module 326 a policy2 data request for the profile. This is shown by message 332. Message 332 is thus requesting the policy tables for the profile "x".

In response to message 332, ISD-P(X) module 326 sends a message 334 back to ISD-R module 322, providing the policy tables for profile "x".

ISD-R 322 may then send a request to the active profile as shown by message 340, which asks for the policy tables from the ISD-P(A) module 324.

ISD-P(A) module 324 sends a response 342 back to the ISD-R 322.

The ISD-R 322 then looks at the policies of both the active profile as well as the profile to be activated and compares the policies to determine whether or not the policies allow for the activation of the second profile. In the embodiment of FIG. 3, a determination is made by ISD-R module 322 that such activation is not permitted and therefore message 350 is sent back to the LPA/LUI 310 in which the enable profile message is rejected. A cause may be associated with the rejection. For example, in the embodiment of FIG. 3, the cause indicates that the activation of the profile is not allowed by the active profile.

Optionally, as seen by block 360, the LUI may display a message on the user interface of a mobile device that the activation has failed and may provide the cause for such failure.

While the embodiment of FIG. 3 provides for a single active profile, this is merely an example and is not limiting. In other embodiments multiple profiles may already be active. In this case the ISD-R may compare the plurality of active profiles with the profile to be activated and make a determination as to whether or not the profile may be activated.

In one embodiment, failing the policies of even one of the active profiles will cause an enable profile rejection message to be sent back to the LPA/LUI 310.

Figure 4:
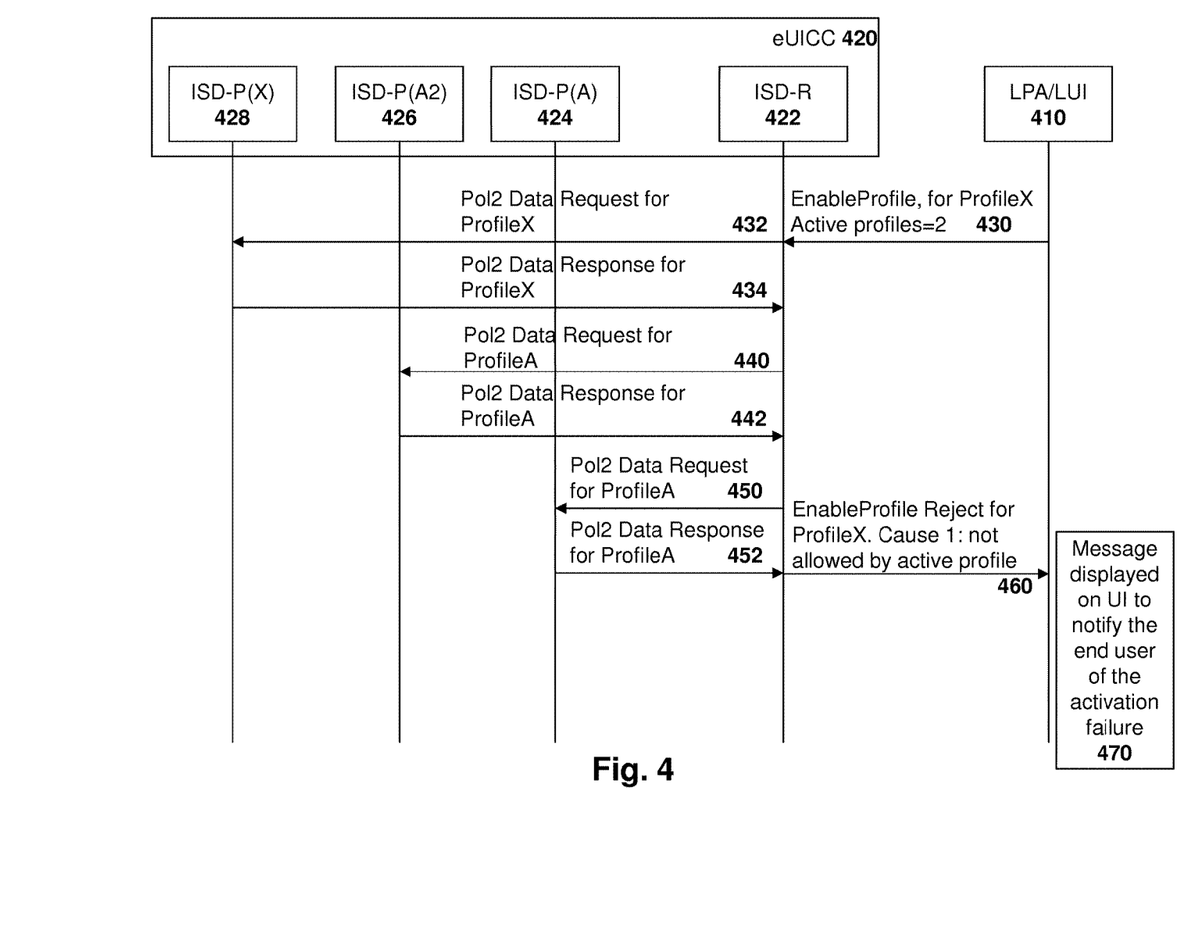
FIG. 4 is a data flow diagram showing messaging used to determine whether to enable an inactive profile on an eUICC having two active profiles.

Thus, as seen in FIG. 4, LPA/LUI 410 communicates with eUICC 420. eUICC 420 includes the ISD-R module 422 as well as an ISD-P(A) module for a first active profile, as shown by reference 424. Further, an ISD-P(A2) module 426 is shown as a second active profile.

ISD-P(X) module 428 shows the ISD-P for the profile to be activated.

Similar to FIG. 3, an enable profile message 430 is sent from LPA/LUI 410 to ISD-R module 422. The ISD-R module 422 may then obtain the policy tables from the ISD-P(X) 428, as shown by message 432. A response may be provided in message 434.

The ISD-R module 422 may then poll each of the active ISD-P modules to obtain the policies for the active profiles. Thus, as shown by message 440, ISD-P(A2) module 426 is queried for its policy table and a response is provided back in message 442.

Similarly, ISD-P(A) module 424 is queried in message 450 and a response is provided in message 452.

ISD-R module 422 may then compare all of the policy tables and make a decision as to whether or not the new profile may be enabled. Again, in the example of FIG. 4, the rejection is shown by message 460 back to LPA/LUI 410. A cause may be included within message 460. For example, the cause may indicate that the activation is not allowed by an active profile. In one embodiment, the particular active profile that is the cause of the rejection may be identified. However such identification is optional.

The message may then be optionally displayed on a user interface, shown by block 470.

Figure 5:
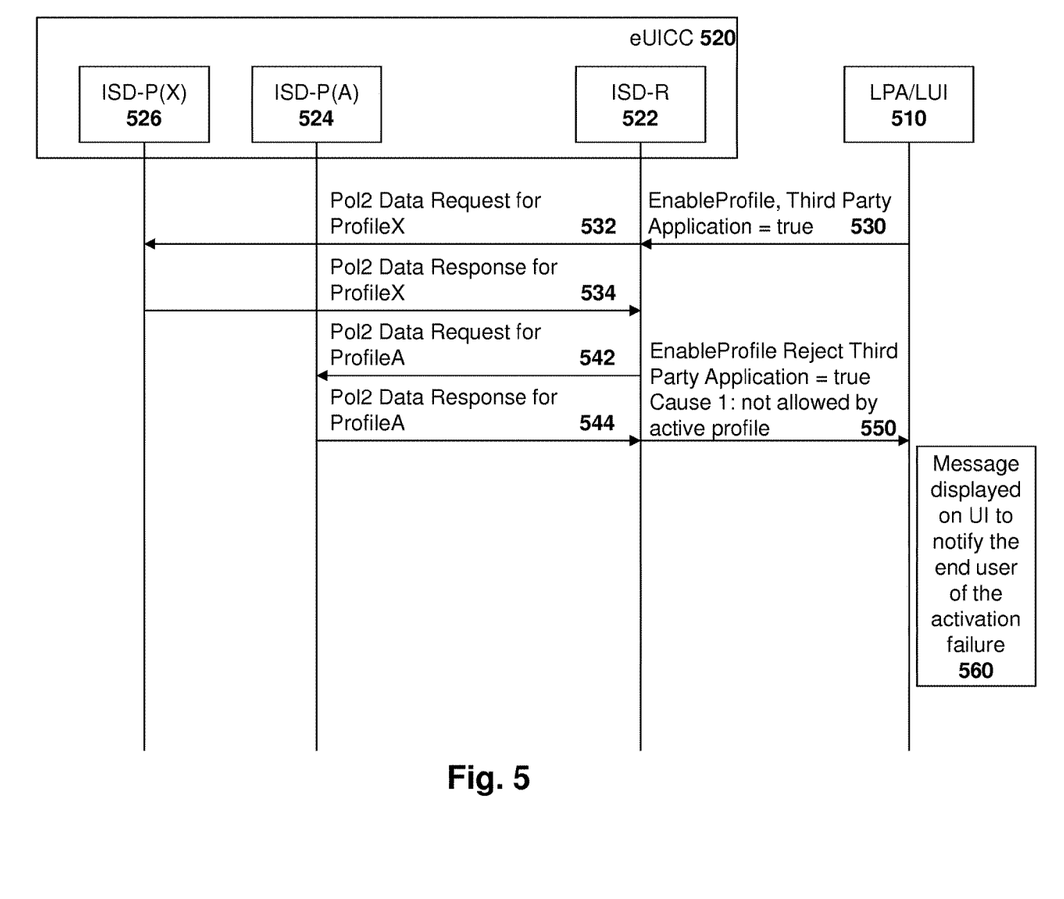
FIG. 5 is a data flow diagram showing messaging used to determine whether to enable a third party application associated with an inactive profile on a device.

In a similar manner to FIGS. 3 and 4 above, the activation of a particular application associated with a profile may utilize the policies of the profile to determine whether such application launch is allowed. For example, an application launcher on a device may query the LPA/LUI whether such application may be launched and based on such query a decision may be made. Reference is now made to FIG. 5.

In the embodiment of FIG. 5, LPA/LUI 510 may make a query of eUICC 520. eUICC includes the ISD-R module 522 as well as the ISD-P(A) module 524 for the active profile and the ISD-P(X) module 526 for the profile that is associated with the application that is attempting to be launched.

In the embodiment of FIG. 5, LPA/LUI module 510 sends an enable profile third party application message 530 to the ISD-R module 522.

The ISD-R module 522 then sends a request 532 to the ISD-P(X) module 526. Request 532 polls for the policies of the profile. In response to request 532, message 534 is returned to the ISD-R module 522.

Similarly, ISD-R module 522 then sends a request 542 to the ISD-P(A) module 524. Request 542 requests the policy table for the profile associated with ISD-P(A) module 524.

In response to request 542, a response 544 is returned to the ISD-R module 522.

The ISD-R module 522 then compares the policy tables and makes a determination of whether the third party application may be enabled based on the active profile. In the example of FIG. 5, the determination is made that the application may not be activated. In this case, a message 550 is provided back to the LPA/LUI 510 indicating that the third party application is not allowed to be enabled.

Optionally, message 550 may include a cause. For example indicating that the application is not allowed by the active profile.

Further, the LPA/LUI 510 may provide for a message on a user interface, as shown by block 560, that the launching of the application failed and may further include a cause for such failure.

As with the example of FIG. 3, the example of FIG. 5 is not limited to two profiles, namely an active and an inactive profile. In particular, the embodiment of FIG. 5 may be expanded to have the ISD-R module 522 query a plurality of active profiles in order to obtain policy tables from each of those profiles. The ISD-R 522 may then compare the policies of all of the active profiles in order to make a determination of whether the application may be launched. In such case, the failure to meet even one policy from the active profiles may be cause to reject the launching of the third party application.

From FIGS. 3, 4 and 5 above, new message definitions may be provided for the queries illustrated. For example, messages 330, 430 and 530, shown as an "enable profile" message, may have a message definition as shown by Table 10 below.

TABLE 10

Enable Profile

| DGI | Length | Value Description | | | MOC |
|---|---|---|---|---|---|
| Var | | Enable Profile | | | M |
| | Tag | Length | Value Description | | MOC |
| | '4F' | 5-16 | Applicable Profile | | M |
| | | | Active Profile | | M |
| | | | Third Party Application | | M |
| | | | Application ID | | O |

As seen in Table 10 above, the function may include various values including the applicable profile, the active profile, the third party application and an application identifier.

The applicable profile is a profile number, where the number is between 1 and n. This is the identifier for the profile that is being actioned, e.g. requesting to be activated or the $3^{rd}$ party application contained within is being requested to be activated Further, active profiles are defined by a number n where n=0, 1, 2, 3, . . . n, and enumerates the number of active profiles.

The value description for a third party application may provide for a value of 0 or 1, where 0 indicates that the third party application activation is false, whereas a value of 1 indicates that the third party application enablement is true. This field is used to indicate if the request is to enable a third party application.

The application identifier field is optional and indicates a value n, where n is 1 . . . n and is only required if the third party application field is set to 1.

Similarly, the enable profile accept message (not shown in FIGS. 3-5), may be utilized to indicate that the profile or the third party application are accepted. An example of such function is shown with regard to Table 11 below.

TABLE 11

EnableProfile Accept

| DGI | Length | Value Description | | MOC |
|---|---|---|---|---|
| Var | | Enable Profile Accept | | M |
| | Tag | Length | Value Description | MOC |
| | | | Applicable Profile | M |
| | | | Third Party Application | M |
| | | | Application ID | O |

In the above, the fields are defined as follows. The Applicable Profile is a value for Profile_n, where n=1, 2, 3, . . . , n.

The third party application is a 0 or 1, where 0 indicates false and 1 indicates true.

The application ID is n, where n=1, n) and is only required if the third party application field is true, as described above with regards to Table 10.

Further, an enable profile rejection message, as for example used by messages 350, 460 or 550, may be defined in accordance with Table 12 below.

TABLE 12

EnableProfile Reject

| DGI | Length | Value Description | | MOC |
|---|---|---|---|---|
| Var | | Enable Profile Reject | | M |
| | Tag | Length | Value Description | MOC |
| | | | Applicable Profile | M |
| | | | Third Party Application | M |
| | | | Application ID | O |
| | | | Cause | O |

In Table 12, the fields may be provided as follows. The Applicable Profile is a value for Profile_n, where n=1, 2, 3, . . . , n.

The third party application is a 0 or 1, where 0 indicates false and 1 indicates true.

The application ID is n, where n=1, . . . , n) and is only required if the third party application field is true, as described above with regards to Table 10.

The cause is n, where n=1, 2, 3, . . . n. One example of cause codes is shown in Table 13 below. However, the causes in Table 13 are merely examples and more or less causes could be provided.

TABLE 13

Cause Codes

| Code | Cause |
|---|---|
| 1 | Not allowed by active profile |
| 2 | Not allowed as home |
| 3 | Not allowed as roaming |
| 4 | Not allowed as roaming in a country not specified |
| 5 | Not allowed as profile is not active and home |
| 6 | Not allowed as profile is not active and roaming |

The above therefore provides for various messaging to either accept or reject the enablement of a profile or third party application associated with a profile.

In accordance with the above, multiple simultaneously active profiles and access to third party applications regardless of the active profile provides a consumer with more choice and flexibility when operating his or her device. Such solution further does not require a device to be enabled to have multiple physical SIM cards, which will save hardware costs on the device.

The use of the policies described above allows for the development of roaming solutions for a particular device and operator that may be utilized for potential future revenue for operators. Further, operators may be more willing to accept such solution since there is control by the operator of the profiles being activated.

Figure 6:
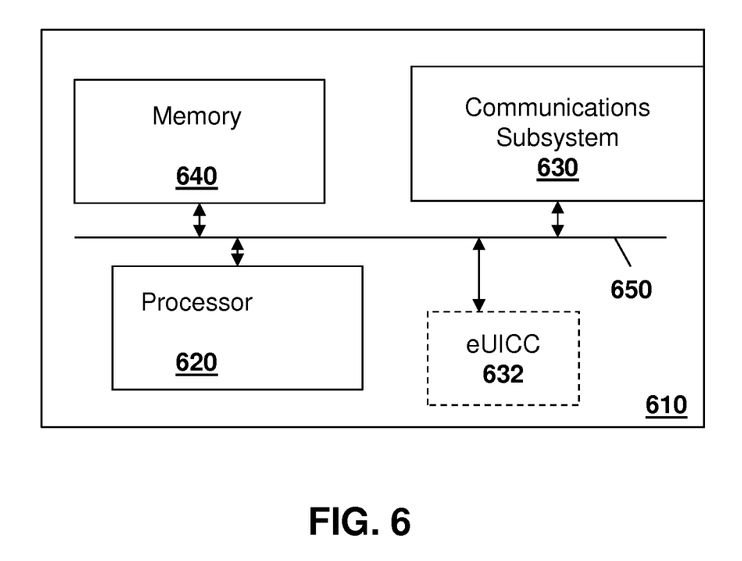
FIG. 6 is a block diagram showing a simplified example network element or device.

The devices, servers and network elements in the embodiments of FIGS. 1 to 5 above can be any device, network element, or part of any network element, including various network servers. Reference is now made to FIG. 6, which shows a generalized network element (including devices).

In FIG. 6, network element 610 includes a processor 620 and a communications subsystem 630, where the processor 620 and communications subsystem 630 cooperate to perform the methods of the embodiments described above. In one embodiment, communications subsystem 630 may include a mobile communications system for communicating with a mobile network using a profile on a eUICC 632.

Processor 620 is configured to execute programmable logic, which may be stored, along with data, on network element 610, and shown in the example of FIG. 6 as memory 640. Memory 640 can be any tangible, non-transitory, storage medium.

Alternatively, or in addition to memory 640, network element 610 may access data or programmable logic from an external storage medium, for example through communications subsystem 630.

Communications subsystem 630 allows network element 610 to communicate with other network elements. Examples of protocols for communication subsystem 630 include cellular, Ethernet, WiFi, WiLAN, among others.

Communications between the various elements of network element 610 may be through an internal bus 650 in one embodiment. However, other forms of communication are possible.

Figure 7:
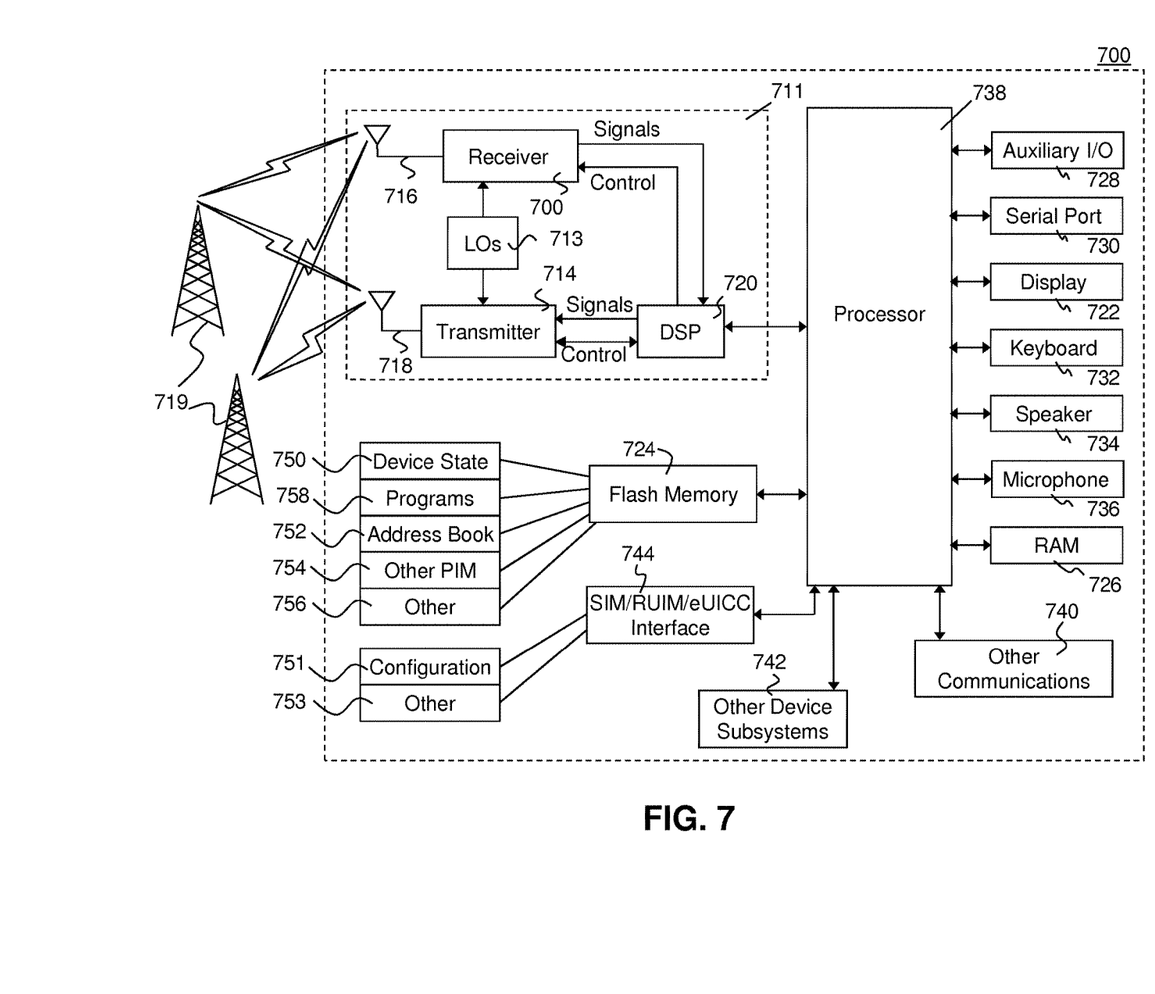
FIG. 7 is a block diagram of a mobile device capable of being used with the embodiments described herein.

If device 610 is a mobile device, one example of such mobile device is shown with regards to FIG. 7.

Mobile device 700 may be a two-way wireless communication device having voice and data communication capabilities. Mobile device 700 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment (UE), or a data communication device, as examples.

Where mobile device 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of mobile device 700. A mobile device may require a removable user identity module (RUIM) or a subscriber identity module (SIM) card in order to operate on a network. The SIM/RUIM interface 744 is normally similar to a card-slot into which a SIM/RUIM card can be inserted and ejected. The SIM/RUIM card can have memory and hold many key configurations 751, and other information 753 such as identification, and subscriber related information.

In other embodiments, instead of a SIM/RUIM, an eUICC may be used as an identity module. The eUICC may be implemented in hardware or software. If implemented in software it may use processor 738 to implement its functionality. If implemented in hardware, the eUICC may have a memory component to store the modules of FIG. 2, and may further include a processor component to execute the processes and embodiments of FIGS. 3-5 described above.

When required network registration or activation procedures have been completed, mobile device 700 may send and receive communication signals over the network 719. As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, among others, in conjunction with the display 722 and possibly an auxiliary I/O device 728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX. The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for enablement of a disabled profile or a third party application associated with the disabled profile on a device, the method comprising:
   receiving, at an identity module on the device, a request to enable the disabled profile or the third party application;
   obtaining, from each profile on the device that is currently active, a respective policy;
   obtaining, from the disabled profile, a policy for the disabled profile;
   evaluating each respective policy of each profile on the device that is currently active;
   evaluating the pole for the disabled profile;
   determining whether at least one policy from the policy for the disabled profile or any of the respective policies for the active profiles prohibit enabling the disabled profile; and
   providing a response to the request to enable the disabled profile based on the determining;
   wherein the policy for the disabled profile and the respective policies for the active profiles govern when profiles may be enabled; and
   wherein the respective policy for each active profile and the policy for the disabled profile includes at least one rule of:
   no restrictions exist to have multiple active profiles;
   a profile can only be active on its own;
   the profile can be active in conjunction with other profiles in a home network;

the profile can be active in conjunction with other profiles in a roaming network;

the profile can be active in conjunction with other profiles in a roaming network in a list of countries; or the profile cannot be active in the presence of other profiles on a list of profiles.

2. The method of claim 1, wherein the list of countries and the list of profiles are each provided as an extension to a command message data field.

3. The method of claim 2, wherein the extension for the list of countries includes at least one mobile country code.

4. The method of claim 1, wherein the extension for the list of profiles includes a mobile country code, mobile network code and group identifier for at least one profile.

5. The method of claim 1, wherein each rule in the policy is represented by a bit in a bit field.

6. The method of claim 1, wherein the respective policy for each active profile and the policy for the disabled profile for enablement of the third party application includes at least one rule of:

no restrictions exist for third party application use;
third party applications stored in the profile can only be used when the profile is active;
third party applications stored in the profile can only be used when the profile is active and when the device is in a home network;
third party applications stored in the profile can only be used when the profile is active and when the device is in a roaming network;
third party applications stored in the profile can be used when the profile is inactive but not in conjunction with a list of applications; or
third party applications associated with a disabled profile cannot be used with a currently active profile.

7. The method of claim 6, wherein the list of applications is provided as an extension to a command message data field.

8. The method of claim 7, wherein the extension for the list of applications includes at least one application identifier.

9. The method of claim 6, wherein each rule in each policy is represented by a bit in a bit field.

10. A computing device configured for enablement of a disabled profile or a third party application associated with the disabled profile, the computing device comprising:
memory;
a processor;
an identity module; and
a communications subsystem,
wherein the computing device is configured to:
receive, at the identity module on the device, a request to enable the disabled profile or the third party application;
obtain, from each profile on the device that is currently active, a respective policy;
obtain, from the disabled profile, a policy for the disabled profile;
evaluate each respective policy of each profile on the device that is currently active;
evaluate the policy for the disabled profile;
determine whether at least one policy from the policy for the disabled profile or any of the respective policies for the active profiles prohibit enabling the disabled profile; and
provide a response to the request to enable the disabled profile based on the determining;

wherein the policy for the disabled profile and the respective policies for the active profiles govern when profiles may be enabled; and wherein the respective policy for each active profile and the policy for the disabled profile includes at least one rule of:

no restrictions exist to have multiple active profiles;
a profile can only be active on its own;
the profile can be active in conjunction with other profiles in a home network;
the profile can be active in conjunction with other profiles in a roaming network;
the profile can be active in conjunction with other profiles in a roaming network in a list of countries; or
the profile cannot be active in the presence of other profiles on a list of profiles.

11. The computing device of claim 10, wherein the list of countries and the list of profiles are each provided as an extension to a command message data field.

12. The computing device of claim 11, wherein the extension for the list of countries includes at least one mobile country code.

13. The computing device of claim 10, wherein the extension for the list of profiles includes a mobile country code, mobile network code and group identifier for at least one profile.

14. The computing device of claim 10, wherein each rule in the policy is represented by a bit in a bit field.

15. The computing device of claim 10, wherein the respective policy for each active profile and the policy for the disabled profile for enablement of the third party application includes at least one rule of:

no restrictions on third party application use;
third party applications stored in the profile can only be used when the profile is active;
third party applications stored in the profile can only be used when the profile is active and when the device is in a home network;
third party applications stored in the profile can only be used when the profile is active and when the device is in a roaming network;
third party applications stored in the profile can be used when the profile is inactive but not in conjunction with a list of applications; or
third party applications associated with a disabled profile cannot be used with a currently active profile.

16. The computing device of claim 15, wherein the list of applications is provided as an extension to a command message data field.

17. The computing device of claim 16, wherein the extension for the list of applications includes at least one application identifier.

18. The computing device of claim 15, wherein each rule in each policy is represented by a bit in a bit field.

19. The computing device of claim 10, Wherein the response to the request to enable the disabled profile or the response to the request to enable the third party application is a rejection, and wherein the response further includes a cause for the rejection.

20. A non-transitory computer readable medium comprising program code, which when executed by a processor of a computing device are configured to cause enablement of a disabled profile or a third party application associated with the disabled profile on the computing device, the program code configured to:

receive, at an identity module on the computing device, a request to enable the disabled profile or the third party application;
obtain, from each profile on the device that is currently active, a respective policy;
obtain, from the disabled profile, a policy for the disabled profile;
evaluate each respective policy of each profile on the device that is currently active;
evaluate the policy for the disabled profile;
determine whether at least one policy from the policy for the disabled profile or any of the respective policies for the active profiles prohibit enabling the disabled profile; and
provide a response to the request to enable the disabled profile based on the determining;
wherein the policy for the disabled profile and the respective policies for the active profiles govern when profiles may be enabled; and
wherein the respective policy for each active profile and the policy for the disabled profile includes at least one rule of:
no restrictions exist to have multiple active profiles;
a profile can only be active on its own;
the profile can be active in conjunction with other profiles in a home network;
the profile can be active in conjunction with other profiles in a roaming network;
the profile can be active in conjunction with other profiles in a roaming network in a list of countries; or
the profile cannot be active in the presence of other profiles on a list of profiles.

* * * * *